(12) United States Patent
Seidel et al.

(10) Patent No.: US 7,671,758 B1
(45) Date of Patent: Mar. 2, 2010

(54) REMOTE CONTROL PROGRAMMING SYSTEM

(75) Inventors: Craig Seidel, Palo Alto, CA (US); David E. Bruce, El Cajon, CA (US)

(73) Assignee: TiVo Inc., Alviso, CA (US)

( * ) Notice: Subject to any disclaimer, the term of this patent is extended or adjusted under 35 U.S.C. 154(b) by 248 days.

(21) Appl. No.: 10/958,674

(22) Filed: Oct. 4, 2004

Related U.S. Application Data

(60) Provisional application No. 60/508,769, filed on Oct. 2, 2003.

(51) Int. Cl.
*G08C 19/00* (2006.01)

(52) U.S. Cl. .............................. 340/825.69; 340/825.22; 340/825.72; 348/734

(58) Field of Classification Search ............ 340/825.69, 340/825.72, 825.22; 348/734; 341/176; 398/106
See application file for complete search history.

(56) References Cited

U.S. PATENT DOCUMENTS

| | | | | |
|---|---|---|---|---|
| 4,703,359 A | * | 10/1987 | Rumbolt et al. | 340/825.69 |
| 4,999,622 A | * | 3/1991 | Amano et al. | 340/825.72 |
| 5,341,166 A | * | 8/1994 | Garr et al. | 340/825.72 |
| 5,629,868 A | * | 5/1997 | Tessier et al. | 348/164 |
| 5,691,710 A | * | 11/1997 | Pietraszak et al. | 340/825.72 |
| 5,796,423 A | | 8/1998 | Robbins et al. | |
| 5,819,294 A | * | 10/1998 | Chambers | 707/102 |
| 6,008,735 A | * | 12/1999 | Chiloyan et al. | 340/825.22 |
| 6,057,874 A | | 5/2000 | Michaud | 348/6 |
| 6,081,855 A | | 6/2000 | deCarmo | |
| 6,133,847 A | * | 10/2000 | Yang | 340/825.22 |
| 6,169,879 B1 | | 1/2001 | Perlman | 455/6.2 |
| 6,239,718 B1 | * | 5/2001 | Hoyt et al. | 340/825.22 |
| 6,380,984 B1 | | 4/2002 | Inoue et al. | |
| 6,476,947 B1 | | 11/2002 | Harvey | |
| 6,530,085 B1 | | 3/2003 | Perlman | 725/82 |
| 6,590,505 B1 | * | 7/2003 | Matsui et al. | 340/825.72 |
| 6,658,663 B1 | | 12/2003 | Bruynsteen | |
| 7,484,234 B1 | * | 1/2009 | Heaton et al. | 725/80 |
| 2002/0140569 A1 | * | 10/2002 | van Ee et al. | 340/825.69 |

OTHER PUBLICATIONS

Cooper, B., "WebTV Plus—An Improvement" TARA News, Feb. 1998 http://www.n2ty.org/newsletter/980205.htm.

* cited by examiner

*Primary Examiner*—Edwin C Holloway, III
(74) *Attorney, Agent, or Firm*—Hickman Palermo Truong & Becker LLP; Kirk D. Wong

(57) ABSTRACT

A method and apparatus for programming a remote control is provided. Control data that identifies one or more mode codes is stored in a computing device that is operationally connected to a detector. A user presses a button on a source remote control to cause an input signal to be transmitted from the source remote control to be received by the detector. The detector decodes the input signal, and consults the control data to determine a particular IR code that is associated with the source remote control. The computing device may then display information identifying a particular mode code on a display to allow the user to manually program a target remote control with the particular mode code. Alternately, the computing device may transmit the particular mode code to the target remote control to allow the target remote control to automatically configure itself with the particular mode code.

27 Claims, 6 Drawing Sheets

REMOTE CONTROL PROGRAMMING SYSTEM

CLAIM OF PRIORITY AND RELATED APPLICATION DATA

This application claims priority to U.S. Provisional Patent No. 60/508,769, entitled "High Speed Commercial Tagging", by James M. Barton et al., filed on Oct. 2, 2003, the contents of which are herein incorporated by reference for all purposes as if originally set forth herein. This application is related to U.S. patent Ser. No. 09/558,410, entitled "Method and Apparatus for Controlling at Least One Set-Top Box", by Kurtis Heaton et al., filed on Apr. 24, 2000, now U.S. Pat. No. 7,484,234, the contents of which are herein incorporated by reference for all purposes as if originally set forth herein.

FIELD OF THE INVENTION

This invention relates to programming a remote control.

BACKGROUND

Originally, televisions possessed a simple user interface containing a channel selector, a volume control, and little else. Since the advent of videocassette recorders (VCRs), the user interface for controlling all the available options for displaying content on a television has increased in complexity.

Remote controls typically use infra-red (IR) signals to communicate with devices that they operate. Each IR signal may be described using an IR code. Remote controls that communicate with IR signals typically use an embedded microprocessor and an embedded non-volatile memory chip to store control tables that specify the IR signaling required for communication with the device that the remote control operates.

Remote controls are generally compatible only with a set of devices for which the remote control stores data in the control tables. In other words, a remote control for a TV of brand A will likely not work with a receiver of brand B. Sometimes, even among products of a specific brand, remote controls will not be compatible for a variety of reasons, including (a) different control methods, such as radio frequency (RF) and Infrared (IR), may be used, (b) different signaling protocols, such as variations on pulse width and pulse position, may be used, and (c) different button encodings may be used.

As many consumers wish to minimize the amount of remote controls needed to operate components in their entertainment center, universal remote controls have gained in popularity. A universal remote control is a remote control that will, within limitations, emulate a wide variety of other remote controls, allowing a user to replace a collection of remote controls with a single remote control. Universal remote controls are designed to generate a variety of signals to support the broadest range of devices.

There are several different varieties of universal remote controls. One type of universal remote control is a pre-programmed universal remote control. A pre-programmed universal remote control is configured to emulate a fixed number of remote controls. Each brand of device may assign a remote control with a particular code (referred to herein as a "mode code") that describes how to specify any operation by that remote control. Thus, a particular mode code specifies a set of IR signals (or a set of IR codes) that the remote control supports. To use a pre-programmed universal remote control, a user must configure the pre-programmed universal remote control by indicating which remote control to emulate by entering in the specific mode code (which can be, for example, a four digit numeric code, e.g., "1234") that is assigned to the particular remote control that the user wishes the pre-programmed universal remote control to emulate.

The user must determine which mode code that is supported by the pre-programmed universal remote control in a process that usually involves trial-and-error. The user enters in a set of numbers into the pre-programmed universal remote control to indicate a possible mode code, and thereafter, the user presses a button (e.g., power) to see if the mode code works, i.e., a mode code works if the pre-programmed universal remote control performs the desired action on the intended device using the set of IR codes associated with the mode code. If the selected mode code does not work, the user must try another mode code. This is a time consuming process that is subject to error and may be frustrating to the user.

Another type of remote control, referred to herein as a learning universal remote control, may be programmed to emulate another remote control, generally by programming one operation at a time. A learning universal remote control may capture and copy the IR codes produced by another remote control issuing a command. A user typically configures a learning universal remote control by (a) facing the learning universal remote control towards another remote control, (b) entering a sequence of buttons on the learning universal remote control to initiate the copying of a particular command, and (c) pressing a button on the other remote to generate an IR signal carrying the IR code which is captured by the learning universal remote control. The learning universal remote control can thereafter generate that IR code (or something similar) to perform the same operation on the same device as the other remote control. Undesirably, programming a learning universal remote control may be a complicated and time-consuming process.

An additional type of remote control, referred to herein as a programmable universal remote control, may be programmed via a computer link. A programmable universal remote control may connect to a computer through an interface, such as a USB port, to download information instructing the programmable universal remote control on how to emulate a particular remote control. Programming a programmable universal remote control undesirably requires an appropriate interface to connect with a computer configured to instruct the programmable universal remote control, which may not always be available. Further, users may find programming a programmable universal remote control to be a confusing, frustrating, and time-consuming process.

Consequently, a new approach for programming a universal remote control is needed that does not incur the disadvantages associated with the prior approaches. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
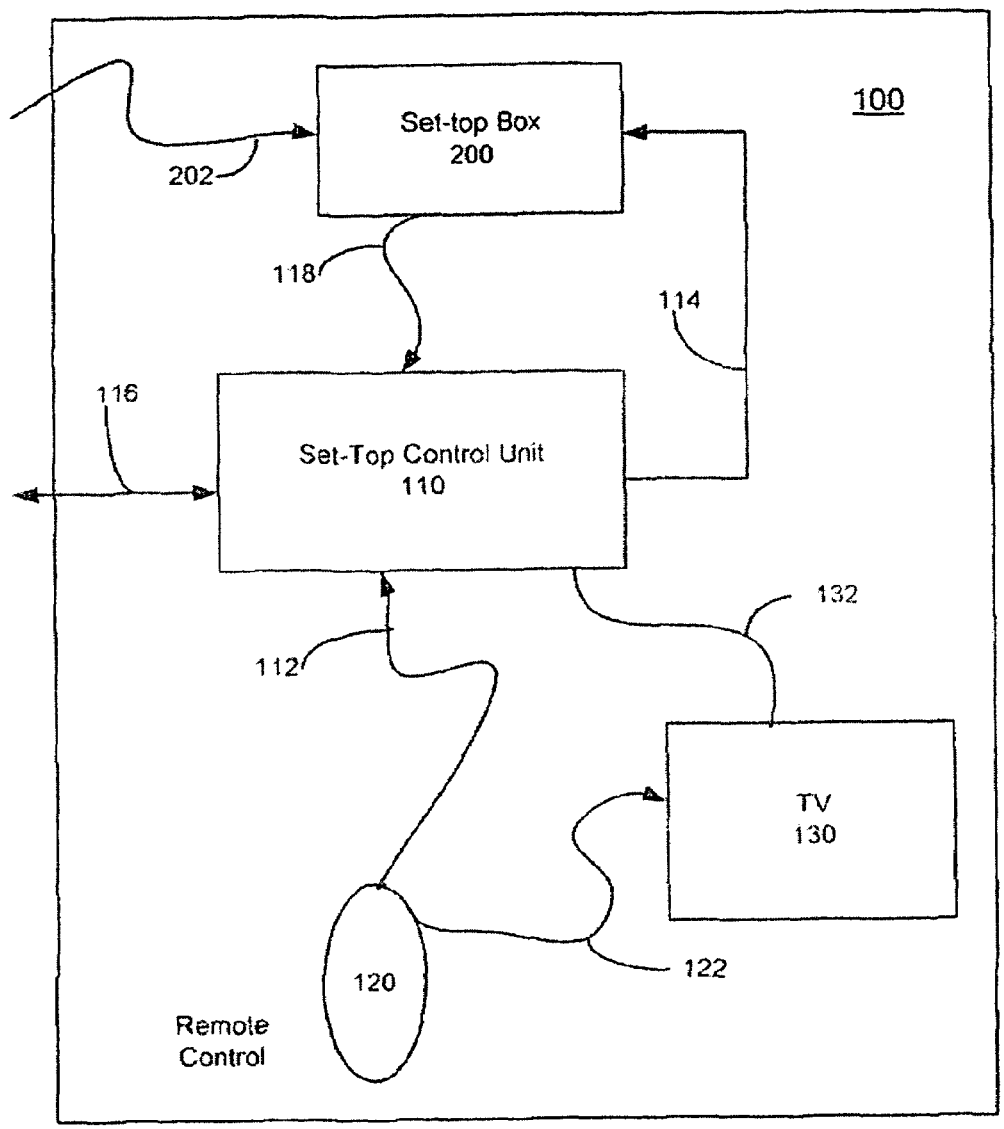
FIG. 1 depicts a system controlling a set-top box according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Embodiments of the invention provide for programming a remote control in an easy and intuitive manner. Embodiments of the invention allow a user to configure a first remote control (referred to herein as a target remote control) to emulate the functionality of a second remote control (referred to herein as the source remote control). For example, users may use embodiments of the invention to configure a target remote control to emulate the functionality of a plurality of source remote controls, i.e., a single target remote control may be configured to emulate the functionality of more than one source remote control.

The mode code of a source remote control is identified and thereafter communicated to the target remote control. The mode code of the source remote control may be identified, as explained in further detail below, by analyzing the IR codes contained within received signals transmitted from the source remote control.

In an embodiment of the invention, a computing device stores control data that identifies one or more mode codes. Each of the one or more mode codes identifies a set of signals (or IR codes) used by a type of remote control to control a type of device. The computing device also stores data about the set of IR codes associated with each mode code. The computing device may be implemented using a Digital Video Recorder (DVR) from TiVo Inc. In this example, the DVR stores control data that identifies how to program a variety of remote controls. The computing device is coupled to a detector that is capable of exchanging signals with a remote control, e.g., the DVR contains IR control 620, described in further detail below. To facilitate the ease of programming the target remote control and to minimize any possible frustration on behalf of the user, the computing device may display instructions and/or assistance on a display, such as a television, to walk the user through all parts and aspects of the process.

To program a target remote control, a user presses a button on the source remote control to cause a signal, such as an IR signal containing an IR code, to be transmitted from the source remote control to be received by the computing device. The computing device analyzes the received signal to determine operation data that identifies an operation indicated by the signal. The operation data may contain an IR code. For example, if the user pressed the button to increase the volume, then the operation data contained within the signal would indicate the IR code associated with the operation to increase the volume on the device being controlled by the source remote control.

The computing device consults the control data store to determine, based at least in part on the operation data, a particular mode code that is associated with the source remote control. The particular mode code identifies the set of signals used by the source remote control to control a particular device. Thus, in the above example, the computing device may determine that the source remote control is model XYZ because the IR code contained in the operation data received in the signal matches model XYZ. The computing device may use the IR codes contained within the operation data to determine the mode code of the source remote control.

Once the particular mode code is identified, it may be used to program the target remote control using a variety of methods. For example, the computing device may display a user interface on a display, such as a television, that visibly presents the particular mode code to the user. The user may thereafter manually program the target remote control with the particular mode code. In another embodiment, the computing device may transmit the particular mode code to the target remote control. Once the particular mode code is received by the target remote control, the target remote control may configure itself using the particular mode code without user intervention.

Other embodiments shall be discussed to enhance the ease of use and efficiency of programming the target remote control. For example, the computing device may allow a user to select a particular brand of a device by the target remote control on a user interface. Once the computing device receives data that indicates the user's selection, the computing device may eliminate possible modes codes based on the selected brand. Additionally, the computing device may suggest to the user certain operations to perform or keys to press on the source remote control to help distinguish the mode code of the source remote control between possible mode code candidates based on the IR code produced by the source remote control.

Architecture Overview

Prior to discussing the functional steps performed by embodiments of the invention, the architecture of an embodiment shall be presented. FIG. 1 depicts a system 100 including set-top control unit 110 controlling an external set-top box 200 in accordance with certain embodiments.

Certain embodiments are implemented as an advanced set-top unit 110 packaged in a shipping container with cables, accessories, and a remote control 120. Certain further embodiments provide control of cable and satellite set-top boxes 200 by IR control 114. Certain embodiments support some satellite boxes 200 by serial control 114. In certain embodiments, remote control unit 120 may be a TiVo Remote Control Unit, available from TiVo Incorporated, of Alviso, Calif.

The television source 202 can be from a variety of sources, including: 1) a roof-top antenna or rabbit ears receiving terrestrial analog broadcast, 2) a buried coaxial cable delivering analog and digital cable signals, 3) a satellite antenna receiver digital satellite broadcast, and 4) a roof-top antenna receiving terrestrial digital broadcast.

If the signal source 202 is from a roof-top or rabbit ear antenna, a user connects the cable from the antenna directly to the RF input on the Set-top control unit. The internal tuner in the Set-top control unit set-top box is used to select which program to view or record. The viewer selects which channel to tune to by using the remote control unit 120. After the selection is made, the Set-top control unit tunes its internal tuner to receive the channel selected.

If the signal source 202 is from a buried cable from a cable provider, the user can choose to: 1) connect the cable to an analog set-top box, 2) connect the cable to a digital set-top box, or 3) connect the cable directly to the Set-top control unit. Note that in certain embodiments, the cable may be fiber optic. In certain other embodiments, the cable may be coaxial cable.

If the signal source 202 is from cable and the user has an analog cable set-top box, the cable is connected to the cable set-top box. Note that in certain embodiments, the cable may be fiber optic. In certain other embodiments, the cable may be coaxial cable. The cable set-top box contains an internal tuner that will be tuned to the channel the viewer wishes to view or record. The cable set-top box 200 is then connected 118 to the Set-top control unit 110 in one of two ways:

1) The channel selected is modulated onto either channel 3 or 4 and output on a RF connector. The RF connector is connected 118 to the RF input connector on the Set-top control unit 110 and the internal tuner 640 (see FIG. 2) in the Set-top control unit 110 is tuned to channel 3 or 4 to receive the channel.

2) The channel selected is output on either a composite or S-Video connectors. These connectors are connected 118 to composite or s-video inputs on the Set-top control unit 110. If available, the preferred connection 118 is using s-video; if S-Video is not provided then the preferred connection 118 is composite in certain embodiments. Both s-video and composite provide higher quality connections 118 than RF in certain embodiments.

The viewer selects which channel to tune to by using the Remote Control Unit 120. After the selection is made, the set-top control unit 110 transmits an IR signal 114 to the Cable set-top box 200 and the Cable set-top box 200 tunes its internal tuner to the channel. The channel is passed to the set-top control unit 110 by either the RF, composite, or S-Video outputs. The set-top control unit 110 must be configured to receive the channel from its RF, composite, or S-Video inputs. If the RF input is selected, the Set-top control unit 110 must also tune its internal tuner 640 (see FIG. 2) to either channel 3 or 4, depending upon which channel the cable box 200 is configured to receive the signal.

If the signal source 202 is from cable and the user has a digital cable set-top box 200, the cable 118 is connected to the digital cable set-top box 200. Note that in certain embodiments, the cable may be fiber optic. In certain other embodiments, the cable may be coaxial cable. The digital cable set-top box 200 contains an internal tuner that will be tuned to the channel the viewer wishes to view or record. The cable set-top box 200 connects 118 to the set-top control unit 110 in one of two ways:

1) The selected channel is modulated on either channel 3 or 4 and output on a RF connector. The RF connector is connected to the RF input connector on the Set-top control unit 110 and the internal tuner in the Set-top control unit 110 is tuned to channel 3 or 4 to receive the channel, and 2) The channel selected is output on either a composite or S-Video connectors. These connectors are connected to composite or s-video inputs on the Set-top control unit 110. Using the S-Video connectors in certain embodiments provides the highest quality connection.

The viewer selects which channel to tune to by using the TiVo Remote Control Unit 120. After the selection is made, the Set-top control unit 110 transmits 114 an IR signal to the digital cable set-top box 200 and the digital cable set-top box 200 tunes its internal tuner to the channel. The channel is passed 118 to the TiVo set-top unit 110 by either the RF, composite, or S-Video outputs. The TiVo set-top unit 110 must be configured to receive 118 the channel from its RF, composite, or s-video inputs. If the RF input is selected, the Set-top control unit 110 must also tune its internal tuner 640 (see FIG. 2) to either channel 3 or 4, depending on which channel the digital cable box 200 is configured to receive the signal.

If the signal source 202 is from a satellite antenna, the satellite receiver digital set-top box 200 is connected 118 to the Set-top control unit 110 in an identical fashion as described above for a digital cable set-top box 200. As many satellite receivers also require a cable or terrestrial broadcast antenna to receive local channels, the preferred connection for a satellite receiver is using the S-Video connectors in certain embodiments for the highest quality connection. Such connection also leaves the RF input connection on the Set-top control unit 110 free to attach a cable or roof-top antenna to receive local channels.

Some digital satellite receivers support serial data ports. If so, rather than use IR to control the satellite receiver set-top box 200, the serial output port 508 (see FIG. 2) on the Set-top control unit 110 can be connected 114 to the serial data port on the satellite receiver.

If the signal source 202 is from a digital terrestrial antenna and the digital terrestrial set-top box 200 provides an option to output standard NTSC compatible video on either RF, composite, or S-Video outputs. Then one of these outputs can be connected 118 to the corresponding input on the Set-top control unit 110. The digital terrestrial set-top box 200 is connected 118 to the Set-top control unit 110 in an identical fashion as described above for a digital cable set-top box 200. The connection 118 using S-Video provides the highest quality connection in certain embodiments.

Certain embodiments provide server based services through modem access 116. Certain further embodiments provide server based services which include TiVo Services through modem access 116 or network access.

Certain further embodiments support at least some of the following features: Records television programming in digital form on at least one internal hard disk drive. Certain further embodiments support 10 hours of recorded programming and certain other further embodiments support 30 or more hours of programming. Certain embodiments support digital recording of audio-video content including random access to titled programming. Certain further embodiments support digitally accurate fast forward, rewind, slow motion, frame forward, frame back and high-quality freeze frame. Certain embodiments provide a 30 minute buffer of live programming being viewed enabling the viewer to pause, rewind and fast forward live TV.

Certain embodiments provide instant replay of live or recorded sporting events and educational programs. Certain embodiments provide programmable scheduling by time and channel, just like a VCR. Certain embodiments allow viewers to save recorded programs to their VCRs. Certain embodiments provide selectable recording quality.

Figure 2:
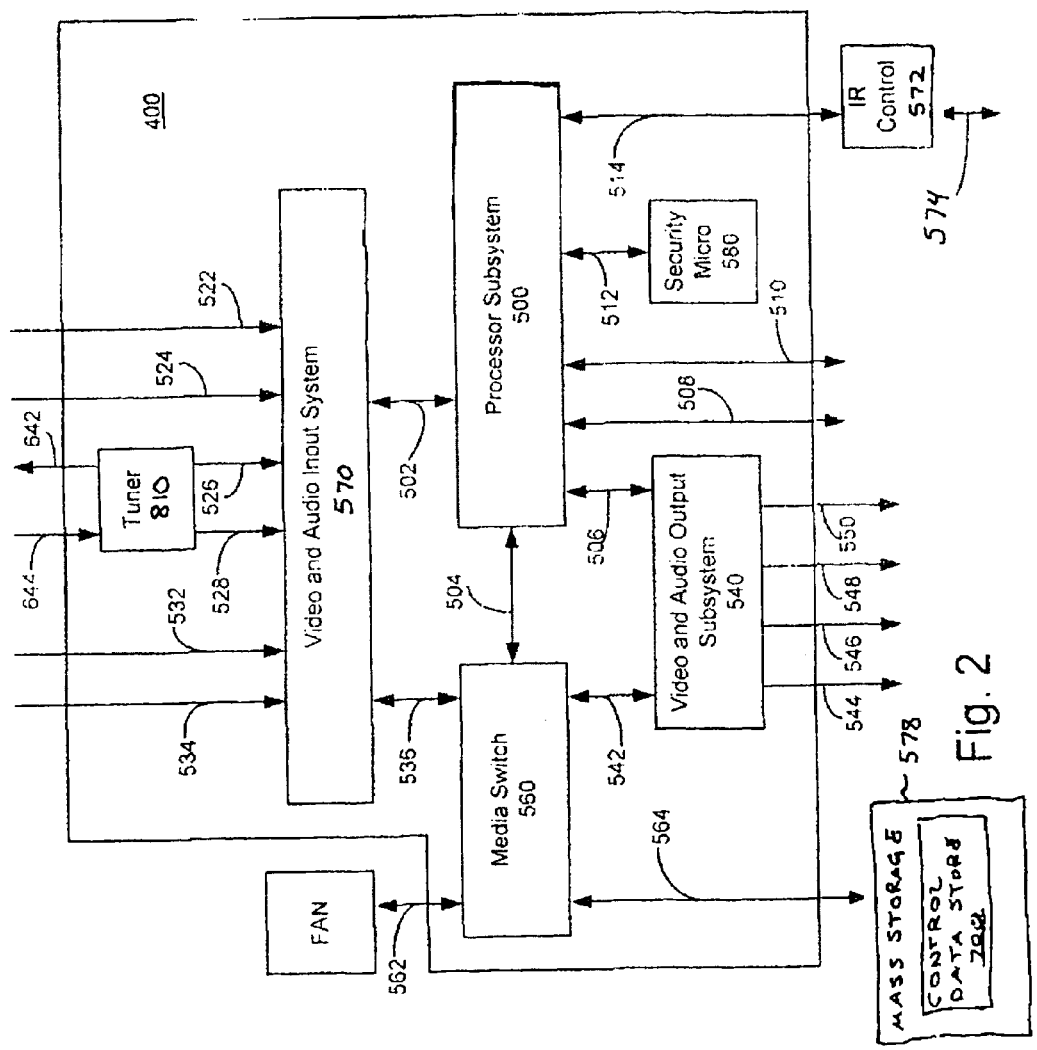
FIG. 2 depicts a system block diagram according to an embodiment of the invention.

Certain embodiments provide a RF input 644 with tuner 640, which is compatible with cable and terrestrial broadcast TV (see FIG. 2). Certain embodiments provide selectable RF input on channel 3, RF input on channel 4, composite, S-Video input, or digital input support for analog cable, digital cable, or satellite set-top devices.

In certain embodiments, a set-top control unit 110 is portable; electronics of the set-top control unit 110 are housed in a metal enclosure approximately 17 inch wide, 13 inches deep and 4 inches high.

Television 130 is fed 132 from set-top control unit 110 in certain embodiments. In certain further embodiments, connection 132 feeds signals from a composite video output 550 (see FIG. 2) of set-top control unit 110. In certain other further embodiments, connection 132 feeds signals from an S-video output 548 (see FIG. 2) of set-top control unit 110. In certain further embodiments, signals can be digital in addition to, or instead of, analog.

FIG. 2 depicts a system block diagram set-top control unit 110 in accordance with certain embodiments. This particular embodiment represents a relatively low level of integration. There are alternative embodiments that maintain many of the same architectural elements, but integrate functions via different means. A particular alternative embodiment incorporates elements of the Processor Subsystem 500, IR Controller 620 and Media Switch 560 into a single integrated circuit.

In certain embodiments, the electronics of set-top control unit 110 consists of a main System Board 400, an IR Controller Board (IR Ctrl) 572, a mass storage system 578, a Fan, and a Power Supply. Set-top control unit 110 supports one left-right stereo pair audio input 532-534, one composite video input 522, one S-Video input 524, one RF input 644 and one RF output 642 modulated onto either channel 3 or 4. In certain further embodiments, digital interfaces such as S/PDIF, Toslink, DVI, and HDMI are supported.

Mass storage system 578 may include any number and type of disk drives in certain embodiments. In certain embodiments, mass storage system 578 may be implemented using Flash memory.

The set-top control unit 110 provides at least one left-right stereo pair audio outputs 544-546, at least one composite video output 550, at least one S-Video output 548, at least one serial input/output 508, at least one IR blaster output 622, at least one IR input 622, and at least one modem input/output 510 which may be connected 116 to an associated phone line in certain embodiments.

The electronics within the area denoted by 400 is located on the System Board. The IR Controller Board (IR Ctrl) 572 and electrically connected with a cable. This allows the IR Controller board 572 to be physically attached to the front panel of the enclosure. For ease of explanation, IR control 572 is shown as a single entity in FIG. 2; however, IR control 572 may be implemented in other embodiments using a first component responsible for IR transmission, and a second component responsible for IR reception. Thus, as broadly used herein, IR control 572 may be implemented by any functional component (or set of components) that are capable of sending and receiving an input signal (IR, RF, or any other type of signal), and is not limited to infra-red input signals, but rather any type of input signal, including, but not limited to, sound and any portion of the electro-magnetic spectrum. IR control 572 may be implemented by a functional component that is capable of receiving an analog signal and converting the analog signal into a digital form for processing. The IR control 572 may be implemented using any combination of hardware and software.

The disk drive(s) in mass storage system 600 are connected by a cable 564 to the System Board 400. The Fan is connected to the System Board 400 with a cable 562. The Power Supply is connected to the System Board 400 and mass storage system 600 with power cables.

The system board 400 can be generally divided into: 1) subsystems that convert analog video and audio from analog to digital data; 2) subsystems that process digital audio and video data; and 3) subsystems that convert digital data back to analog. In other embodiments, digital data is converted to other digital formats such as HDMI.

The Tuner subsystem 810 and video and audio input subsystem 570 accept as input standard analog video and audio signals from set-top boxes, roof-top antennas, or rabbit ear antennas. The video and audio input subsystem 570 converts these signals into digital media streams.

The digital media streams 536 and 502 are processed and stored in the mass storage system 578 by Media Switch 560 and Processor Subsystems 500. Media streams 542 selected by the user to view are retrieved 564 from the mass storage system 578 by the Media Switch 560 and Processor Subsystem 500. Retrieved media stream 542 is converted from digital to analog by the Video and Audio Output Subsystem 540. Media Switch 560 and Processor Subsystem 500 also perform miscellaneous house keeping functions such as temperature monitoring and fan control 562. The Security Microprocessor 580 performs system identification and authentication for security purposes.

The System Board partitions into CPU, Input, and Output Subsystems. Each subsystem will be discussed in more detail below.

The Processor subsystem 500 includes the following in certain embodiments. The CPU is an IBM Power PC. The boot ROM is a 1 mega-bit Flash. The main memory is 4 meg×32-bit, implemented using two 4096k× 16-bit EDO RAMs. The serial port is multiplexed to interface to the IR Controller Board and the Security Microprocessor. A second serial UART implements the external serial port that controls DSS Receivers. The modem is implemented with a Rockwell chipset and has an attached 1 mega-bit Flash that contains its microcode. The Media Switch ASIC controls multimedia streams to and from the disk drive. It also implements a number of system functions including the IDE disk drive controller, fan control and i2C bus control. The CPU Subsystem has a battery backed-up real-time clock and a temperature sensor interfaced to the i2C bus. The I2C bus is also used to control 502 Video and Audio Input system 570 and to control 506 Video and Audio Output Subsystem 540.

The Video and Audio Input Subsystem 570 inputs video and audio from I/O connectors, converts it from analog to digital and encodes it using MPEG2 compression. Channel selection is performed with a tuner 810 when the RF input is selected. The video and audio are converted from analog to digital and then passed to a compression engine. In certain embodiments, only one video/audio source can be selected at a time to be processed by the compression engine.

The video compression is performed with an MPEG encoder chip set in certain embodiments. In certain embodiments, an MPEG encoder chip set coupled with RAM memories performs video compression. In certain further embodiments, the MPEG encoder chip set is composed of exactly one integrated circuit. A Sony MPEG2 encoder chip performs video compression in certain further embodiments. A DSP is used in certain embodiments to perform audio compression. In certain further embodiments, a DSP from Analog Devices is used to perform audio compression.

The Video and Audio Output Subsystem 540 decompresses video and audio cached on mass storage system 578, converts it back into analog signals, and drives the output connectors. Certain embodiments of set-top control unit 110 support at least one stereo pair of audio output, at least one composite video output, at least one S-Video output and at least one RF output modulated onto either channels 3 or 4. Certain further embodiments of set-top control unit 110 support at least two stereo pair of audio output and at least two composite video outputs.

The compressed video/audio stream 542 is transferred to an MPEG2 decoder chip set for decoding in certain embodiments. In certain further embodiments the MPEG decoder chip set is coupled to RAM memory. The compressed video/audio stream 542 is transferred to an IBM MPEG2 decoder chip with coupled RAM memory for decoding in certain further embodiments.

The uncompressed digital video, output by the MPEG decoder chip set, is sent to a video encoder to convert the video back into analog form before driving the video output connectors in certain embodiments. In certain further embodiments, a Phillips video encoder chip performs the conversion. Audio is mixed with user interface sound effects before driving the audio output connectors in certain embodiments. Audio is converted from digital into analog and then mixed with user interface sound effects before driving the audio output connectors in certain further embodiments.

The IR Controller Board 572 contains an IR Microcontroller, an IR Photo receiver module, and LED's indicators. IR controller board 572 is connected 514 to the System Board with a ribbon cable that connects the IR Microcontroller to the Power PC using the Power PC's serial port in certain embodiments. In an alternative embodiment, the IR receive and transmit control functions are incorporated into the same integrated circuit as the Processor Subsystem and are connected internally. In this alternative embodiment, the IR photo receiver and LED indicators may be on a separate board than the integrated circuit, connected by a cable. One of ordinary skill in the art shall appreciate that there are many ways to configure IR transmit and receive hardware.

Set-top control unit 110 mass storage system 578 supports any number of disk drives in certain embodiments. The power for the disk drives is connected directly from the power supply. The IDE interfaces of the drives are connected 564 to the System board with a flat ribbon cable.

Note that in certain embodiments, IR control codes are stored in an IR control code database 1100 (see FIG. 3) residing on mass storage system 578.

Figure 3:
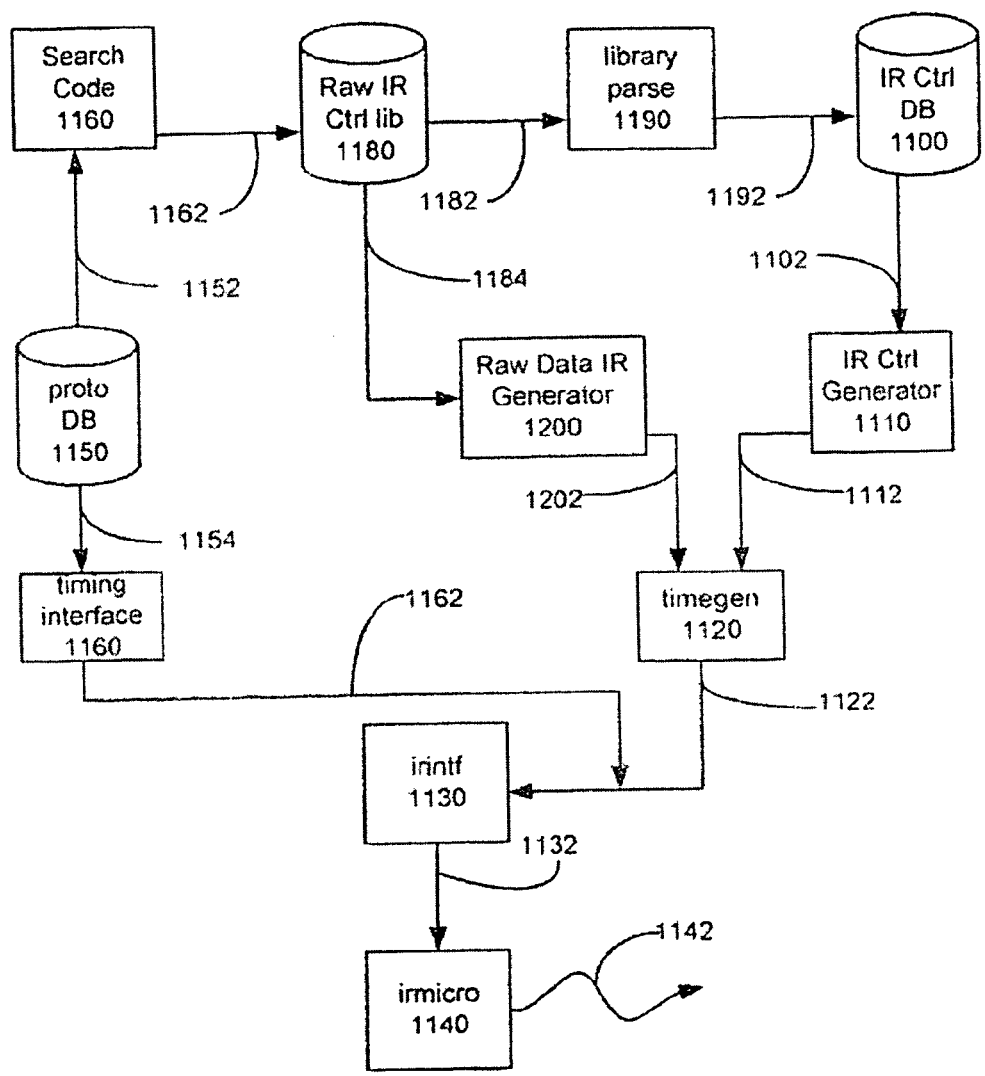
FIG. 3 depicts a data flow regarding IR control of an external set-top box according to an embodiment of the invention.

FIG. 3 depicts data flow regarding IR control of external set-top boxes in accordance with certain embodiments.

In certain embodiments, IR control database 1100 resides on the mass storage system 578 and contains at least one IR control entry. A first IR control entry is accessed 1102 to IR control generator 1110. IR control generator 1110 processes the IR control entry and sends 1112-1122 it to be prepared 1130 for presentation 1132 to a serial device 1140. Serial device 1140 serially transmits this presented information as control signals to an external set-top box.

In certain further embodiments, timing generation 1120 is performed before 1122 it is prepared 1130 for presentation 1132 to a serial device 1140. In certain embodiments, preparation 1130 includes processing similar to the "C" programming language function "sprintf". In certain further embodiments, preparation 1130 includes multiplexing serial streams to be sent to serial device 1140. In certain further embodiments, preparation 1130 includes queuing various multiplexed serial streams to be sent to serial device 1140.

In certain embodiments, the serial device 1140 includes at least one IR controller. In certain further embodiments, the serial device 1140 further includes a second serial device physical transport layer, which may include either wireline or wireless transport mechanisms.

In certain embodiments, raw IR control library 1180 resides on the mass storage system 600 and contains at least one raw IR control entry. A first raw IR control entry is accessed 1182 by a library parsing operation 1190 to create a processed first IR control entry. The processed first IR control entry is communicated 1192 and received 1192 to create a received first IR control entry. The received first IR control entry is inserted into IR control database 1100 as an IR control entry of the IR control database 1100.

In certain further embodiments, first raw IR control entry is accessed 1182 by a library parsing operation 1190 to create a processed first IR control entry syntactic specification. The processed first IR control entry syntactic specification is communicated 1192 and received 1192 to create a received first IR control entry.

Syntactic specifications provide for the specification of many crucial forms of communication information in an IR control entry. This includes but is not limited to specification of how many digits are in a channel. This also includes but is not limited to specifying whether an enter or cancel key is used at the end of IR blasting sequence to delimit channels. This also includes but is not limited to specifying delays between transmission of digits or symbols. This also includes but is not limited to specifying prefix keys. Prefix keys are not digits, which may used to delimit switch settings in certain embodiments. Many set-top boxes have an A/B switch, often with channels on both A and B switch settings. Some set-top boxes supporting satellite reception further have a C-band switch setting. This also includes but is not limited to specifying postfix keys. Postfix keys are not digits which alter the interpretation of the preceding IR blasting sequence.

Note that a syntactic specification may be the entire IR control entry, or a part of the entry. This also includes but is not limited to syntactic specifying IR control entries further referencing other syntactic specifying IR control entries. This supports development of complex blasting codes to perform essentially macro operations.

In certain further embodiments, the first raw IR control entry is accessed 1184 by raw data IR generator 1200 to create a raw IR control packet, which processes the raw IR control packet and sends 1202-1122 it to be prepared 1130 for presentation 1132 to a serial device 1140. Serial device 1140 serially transmits this presented information as control signals to an external set-top box.

In certain further embodiments, timing generation 1120 is performed before 1122 it is prepared 1130 for presentation 1132 to a serial device 1140. In certain embodiments, preparation 1130 includes processing similar to the "C" programming language function "sprintf". In certain further embodiments, preparation 1130 includes multiplexing serial streams to be sent to serial device 1140. In certain further embodiments, preparation 1130 includes queuing various multiplexed serial streams to be sent to serial device 1140.

In certain embodiments, a prototype IR control database 1150 resides on mass storage system 600 containing at least one prototype IR control entry. A control code search 1160 accessing 1152 a first prototype IR control entry creates a first raw IR control entry for raw IR control library 1180. In certain further embodiments, the first prototype IR control entry is accessed 1154 by timing interface 1160 to create a first IR control packet, which then follows the same data flow 1122 as has been previously described.

Figure 4:
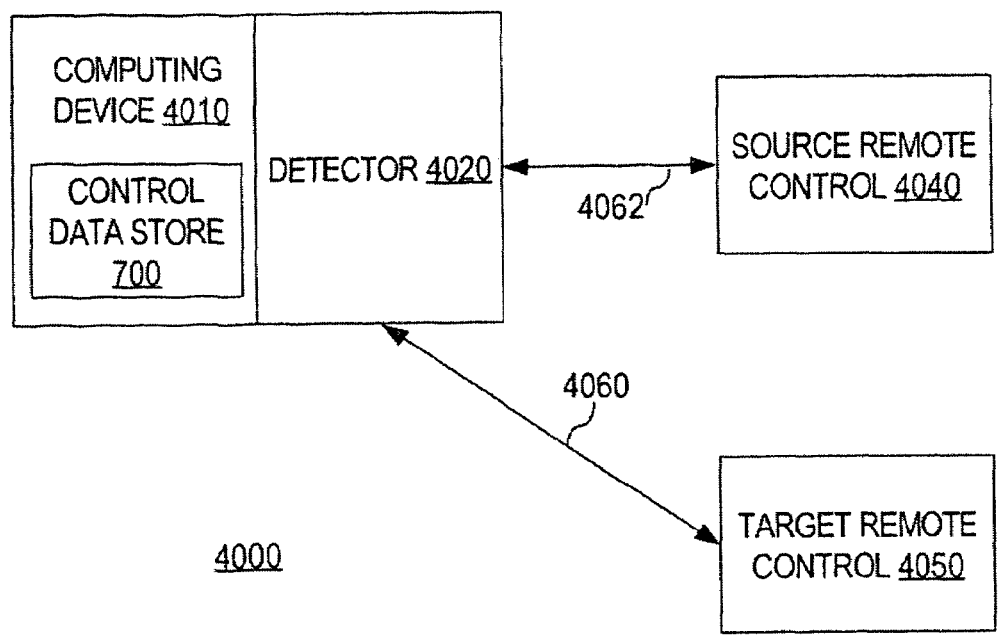
FIG. 4 is a block diagram of a system according to an embodiment of the invention.

FIG. 4 is a block diagram of a system 4000 according to an embodiment of the invention. System 4000 includes a computing device 4101, a detector 4020, a source remote control 4040, a target remote control 4050, and communications links 4060 and 4062.

Computing device 4010 may be implemented using any computerized device that is capable of processing and storing control data. In an embodiment, computing device 4010 (in conjunction with detector 4020) performs the functional steps illustrated in FIG. 6. The functions performed by computing device 4010 are described in further detail below.

Detector 4020 is a functional component that receives signals from remote controls, sends signals to remote controls. Detector 4020 is operationally connected to computing device 4010, and may exchange data with computing device 4010. Detector 4020 may be implemented using any means that can exchange signals over communications links 4060 and 4062 with remote controls. Detector 4020 captures and decodes signals received from remote controls. Although many remote controls use radio frequency (RF) or infra-red (IR) transmitters, detector 4020 may communicate with remote controls using any transmission medium, including portions of the electromagnetic spectrum and sound.

The functional components of FIG. 4 are not intended to represent the only embodiments of the invention, as other embodiments may perform the functions described above in a single component, or multiple other components.

In an embodiment, computing device 4010 includes a control data store 700 that may be implemented using any volatile or non-volatile memory capable of storing control data. Control data, described in further detail below, is used by certain embodiments to program target remote control unit 4050. Control data may be populated in control data store by a variety of means, e.g., it may be stored at time of manufacturer of computing device 4010 or may be loaded into control data store over a network connection (not shown).

Source remote control 4040 refers to any remote control whose functions are to be emulated in target remote control 4050. Target remote control 4050 refers to any remote control that is being configured to emulate the functionality, in whole or in part, of source remote control 4040. While only one source remote control is depicted in FIG. 4 for ease of explanation, system 4000 may be employed to copy the functionality, in whole or in part, of any number of source remote controls 4040 to target remote control 4050.

Communications link 4060 may be implemented by any medium or mechanism that provides for the exchange of data between detector 4020 and target remote control 4050. Communications link 4062 may be implemented by any medium or mechanism that provides for the exchange of data between detector 4020 and source remote control 4040. Examples of communications links 4060 and 4062 include, without limitation, IR signals, RF signals, sound, and any portion of the electromagnetic spectrum.

Figure 5:
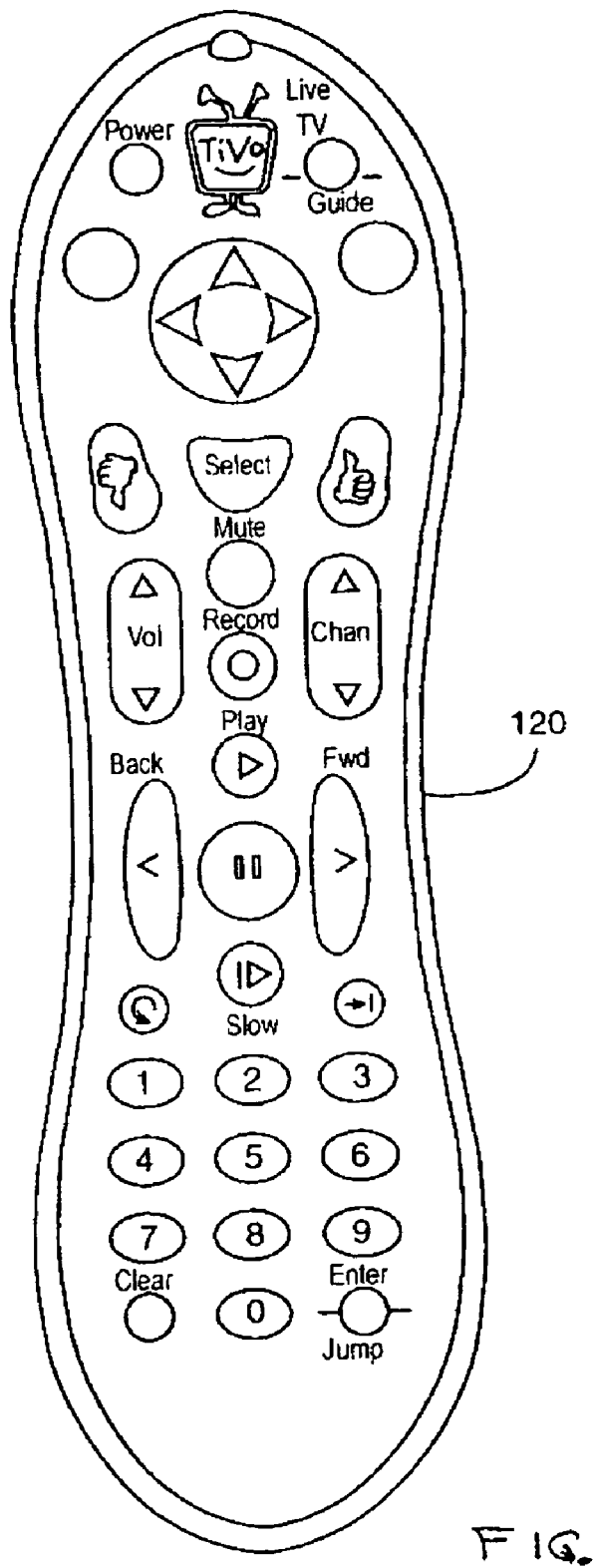
FIG. 5 depicts a remote control according to an embodiment of the invention.

FIG. 5 depicts a hand held remote control 120 in accordance with an embodiment of the invention. The remote control in FIG. 5 may be used as source remote control 4040 or target remote control 4050. The remote control of FIG. 5 is merely illustrative, as any remote control may be used as either source remote control 4040 and any universal remote control may be used as target remote control 4050.

Programming a Remote Control

Figure 6:
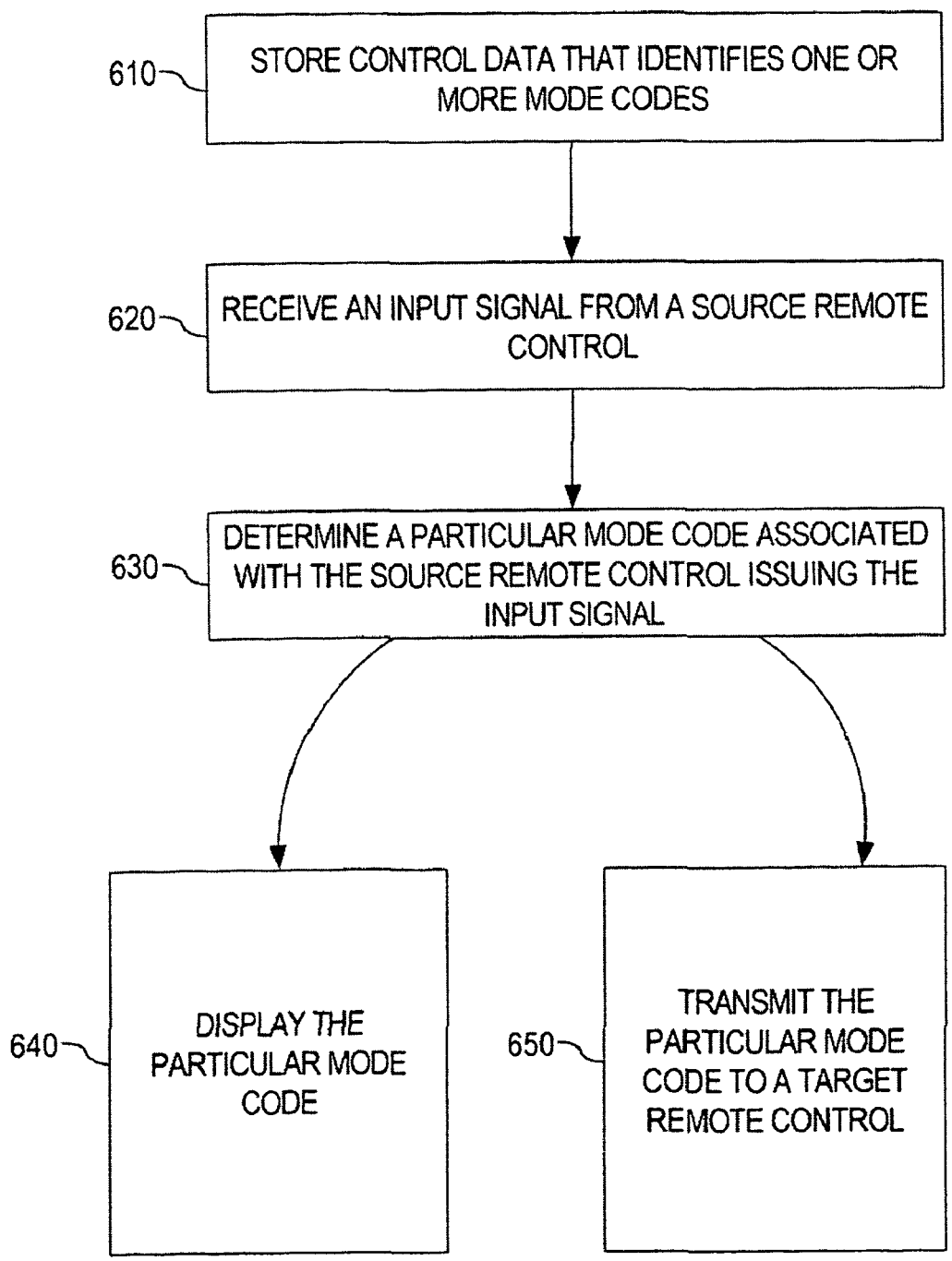
FIG. 6 is a flowchart illustrating the functional steps of an embodiment of the invention.

FIG. 6 is a flowchart illustrating the functional steps of an embodiment of the invention. In step 610, control data that identifies one or more mode codes is stored. Control data may be stored in step 610 in control data store 700. Control data contains information about remote control signaling, e.g., the data store may contain information about a set of mode codes, and information about the set of IR codes associated with each mode code. Control data is used to match input signals transmitted by a remote control device to known signals of remote controls.

In this embodiment, control data store 700 stores information employed by embodiments to map one or more user button presses to a set of mode codes. For example, the control data store 700 may contain sets of all mode codes for a particular remote control, and the set of IR codes associated with each mode code. Control data store 700 may contain information about each remote control such as carrier frequency, pulse descriptions, protocol and button identifiers. Control data store 700 may also contain information that maps mode codes to a brand of the target devices controlled by the mode codes.

Control data store 700 may be organized for more efficient processing. For example, it may be presorted or include an index, such as an index on a brand of a device controlled by a remote control or an index on any detectable element of the remote control signal. Data stored in control data store 700 may be preprocessed (possibly including hand processing) to optimize the user interaction. Data stored in control data store 700 may also be compressed to store as much data in control data store as possible. After the performance of step 610, processing proceeds to step 620.

In step 620, an input signal is received. Step 620 may be performed by a user directing a source remote control towards set-top unit 110 and pressing a button, e.g., pressing the number "3" on the source remote control. Although most remote controls typically use radio frequency (RF) or Infrared (IR) transmitters, an input signal may be sent to set-top unit 110 by the source remote control using a variety of means, e.g., anywhere within electromagnetic spectrum, sound, or any other method of transmitting a signal. Likewise, the target remote control may also communicate using a variety of means, e.g., anywhere within electromagnetic spectrum, sound, or any other method of transmitting a signal. Thus, the input signal received in step 620 may be transmitted using any method for transmitting a signal. The input signal received in step 620 may contain an IR code. After the processing of step 620, processing proceeds to step 630.

In step 630, a particular mode code that is associated with the source remote control being configured is determined. In an embodiment, set-top control unit 110 is configured to compare the received input signal received in step 620 to information stored in control data store 700 about which input signals match input signals from specific remote controls. Set-top control unit 110 determines which particular mode code, among the plurality of mode codes stored in control data store 700, is associated with the source remote control.

In an embodiment, step 630 may be performed by analyzing the particular IR code contained within the input signal received in step 620 to determine if the IR code is used by any mode codes identified in the control data stored in the control data store 700. If the IR code is uniquely associated with a particular mode code, then that mode code is the mode code associated with the source remote control. If two or more mode codes may produce the IR code received in the input signal received in step 620, then the computing device will attempt to distinguish between those candidate mode codes, as explained in further detail below, to determine which of the candidate mode codes is associated with the source remote control.

In an embodiment, after the performance of step 630, processing proceeds to step 640. In step 640, set-top control unit 110 displays the particular mode code determined in step 630 on a display, such as TV 130. The set-top control unit 110 may display instructions on the TV to instruct the user on how to program target remote control using the mode code. For example, the particular mode code determined in step 630 may be a short sequence of digits (e.g., 1, 2, 3, 4). When the user enters the digits of the mode code in conjunction with other remote control-specific key presses (used to configure the target remote control with the mode code), the target remote control is programmed to emulate the specific remote control functionality indicated by the mode code. Thus, the target remote control emulates the functionality of the source remote control after the target remote control is configured with the particular mode code. Thereafter, the user may test the target remote control to see if the remote control is emulating the proper functionality, e.g., the user may try to turn the power on and off on the intended device or perform similar tests, and if the user is successful after performing each test, then the target remote control is emulating the functionality of the source remote control.

In another embodiment, after the performance of step 630, processing proceeds to step 650. In step 650, set-top control unit 110 transmits the particular mode code chosen in step 630 to the target remote control. The target remote control may then configure itself using the received mode code. In this way, the user does not need to manually configure the target remote control.

Advantageously, the user may configure the target remote control with greater ease and efficiency over prior approaches. The user may be presented information on TV 130 that clearly walks the user through the process of programming the target remote control. The user has to press only a small number of buttons on source remote control 120 to properly configure target remote control 120 to operate the intended device, thereby reducing both the potential for frustration and the time required in configuring target remote control 120.

Alternatives and Extensions

For ease of explanation, embodiments have been described above wherein control data store 700 is implemented on set-top control unit 110. However, other devices may perform the steps illustrated in FIG. 6. For example, the control data store may also be implemented on a standalone device or integrated into another device, such as TV 130. Any functional component may be configured to perform the steps of FIG. 6 if (a) the component can store control data, and (b) the component can send and receive signals from a remote control. Consequently, as other embodiments of the invention may store control data other than the set-top control unit 110, embodiments of the invention are not limited to any particular component performing a particular step illustrated in FIG. 6.

In another embodiment, set-top unit 110 may interact with the user to improve the accuracy, efficiency and/or simplicity of detecting the particular mode code. In an embodiment, set-top control unit 110 may assist the determination of step 630 by eliminating one or more mode codes from the set of candidate mode codes being considered based on the brand of the device that the user wishes to control. In such an embodiment, set-top control unit 110 may display information on a display (such as TV 130) that instructs a user to select a brand of the device the user wishes to control with the target remote control. For example, set-top control unit 110 may display a list of brands on TV 130, and the user may use the target remote control to select one of the brands. Once the set-top control unit 110 receives an input signal from a remote control that identifies a selected brand, the set-top control unit 110 may narrow its search of potential mode codes that correspond to that brand when performing step 630.

In another embodiment, set-top control unit 110 may display instructions on a display (such as TV 130) that instructs the user to press one or more buttons on the source remote control. Guiding the user to press one or more buttons in a sequence may be advantageous, as particular mode codes may be distinguished based on particular IR codes associated with the operation issued by pressing a button on the source remote control. In other words, by pressing one or a few buttons, the set-top control unit 110 may be able to distinguish a particular mode code from all other mode codes stored in the control data store 700. For example, if, for a set of mode codes, the IR codes associated with the "power" buttons are too similar, the set-top control unit 110 may instruct the user to start by pressing the number "3" on the source remote control to narrow down the possible options in performing step 630, as the IR code associated with the "3" button may be unique for those set of mode codes. If set-top control unit 110 is unable to determine the particular mode code associated with the source remote control after a first iteration, then set-top control unit 110 may instruct the user to press another button that may further narrow the options or resolve to the correct mode code associated with the source remote control.

In an embodiment, in addition to transmitting a mode code to the target remote control, set-top control unit may transfer additional information, such as information describing a user interface to perform operations on the target remote control, to the target remote control. For example, set-top control unit 110 may transfer information to target remote control describing a user interface associated with source remote control in step 630. Thereafter, remote control may use the information to create a user interface displayed on target remote control to enable the user to use the target remote control to perform any operation associated with the source remote control. Advantageously, such an embodiment would allow the target remote control to implement a customized user interface based on a particular mode code that the target remote control was configured to emulate.

In an embodiment, target remote control may be configured to emulate a source remote control that controls any variety of devices. The target remote control may control any device, not just a component in a home entertainment center. For example, the target remote control may operate kitchen appliances, computer equipment, an automobile, a garage door, etc.

For ease of explanation, the term "IR code" has been used herein to refer to data that describes a command that is transmitted from a remote to another entity, as that is a commonly used term in the art as most commands are transmitted using infra-red (IR) signals. However, it should be understood to those in the art that any medium may be used to transport commands from a remote control, e.g., the medium may be within the electromagnetic spectrum, sound, or any other method for transmitting a signal. Thus, the term IR code, as used herein, is not limited to merely a code associated with an infra-red signal, but broadly encompasses any mechanism for identified a command that is transmitted from a remote control to another entity.

Programming Learning Universal Remote Controls

Embodiments of the invention may program learning universal remote controls. A learning universal remote control may receive signals from set-top control unit 110 instructing the learning universal remote control to configure itself to emulate a specific remote control. Set-top control unit 110 may present information on a display, such as TV 130, that instructs the user on how to program the learning universal remote control using data stored in the set-top control unit 110. Set-top control unit 110 may instruct the user to position the target remote control in front of the IR control 620, and the set-top control unit 110 may transmit one or more IR codes that are received by the target remote control. The received IR codes may be used by the target remote control to configure the target remote control.

Programming Programmable Universal Remote Controls

Embodiments of the invention may program programmable universal remote controls. The programmable universal remote control may communicate to set-top control unit 110 through an appropriate interface, such as an USB port, to receive mode codes to configure the programmable universal remote control. An embodiment of the invention may, in addition to transmitting one or more mode codes to a programmable universal remote control, also transmit information describing a user interface used on the programmable universal remote control. The set-top control unit 110 may provide information about a preconfigured user interface for use with a specific mode code. Additionally, the set-top control unit 110 may enable the user to configure his or her own user interface to operate any device he or she wishes, thus allowing the user to make full use of the programmable universal remote control, as it may control any device in a home entertainment center or a device outside of a entertainment center, such as multiple consumer electronics devices, motorized blinds and remotely dimmable lights. In an embodiment, the computing device 4101 may transmit one or more mode codes and/or data describing one or more user interfaces that enable one to submit one or more commands associated with a mode code to a programmable remote control, such as the PRONTO line remote controls manufactured by Phillips.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for programming a target remote control, comprising:
   storing control data at a computing device that identifies a plurality of mode codes, wherein each mode code of the plurality of mode codes identifies a set of signals used by a type of remote control to control a type of device;
   displaying, to a user, a list of brands;
   wherein each mode code of the plurality of mode codes is associated with one brand in the list of brands, a particular brand in the list of brands being associated with two or more mode codes of the plurality of mode codes;
   in response to receiving a selection of a specific brand in the list of brands from the user, eliminating from consideration one or more mode codes of the plurality of mode codes, the one or more mode codes not being associated with the specific brand, to produce one or more candidate mode codes;
   receiving an input signal, at the computing device, from a source remote control, transmitted in response to pressing a particular button on said source remote control;
   determining, at the computing device, a particular mode code from said one or more candidate mode codes, the particular mode code is associated with said source remote control based on matching the input signal to a particular signal in a set of signals that are associated with the particular mode code; and
   transmitting said particular mode code from the computing device to a target remote control, the target remote control configures itself using said particular mode code.

2. The method of claim 1, further comprising:
   displaying information identifying said particular mode code on a display.

3. The method of claim 2, further comprising:
   displaying instructions, on said display, for submitting said particular mode code to said target remote control.

4. The method of claim 1, further comprising:
   displaying information on a display that instructs the user to press said particular button on said source remote control.

5. The method of claim 1, further comprising:
   in response to receiving said input signal, determining a second button on said source remote control that should be pressed to identify the type of said source remote control; and
   displaying information on a display that instructs the user to press said second button.

6. The method of claim 1, further comprising:
   displaying information on a display that instructs the user to select a brand of a device; and
   receiving a second input signal that identifies said brand of said device.

7. The method of claim 1, wherein data encoded in said input signal identifies a particular operation associated with said particular button on said source remote control.

8. The method of claim 1, further comprising:
   in response to receiving said input signal, consulting said control data to determine a sequence of one or more buttons on said source remote control that should be pressed to identify said source remote control.

9. The method of claim 1, wherein the transmitting step further comprises:
   transferring information to said target remote control describing a user interface; and
   wherein said target remote control displays a user interface on said target remote control based on said user interface information.

10. A machine-readable storage medium carrying one or more sequences of instructions for programming a target remote control, wherein execution of the one or more sequences of instructions by one or more processors causes the one or more processors to perform the steps of:
    storing control data at a computing device that identifies a plurality of mode codes, wherein each mode code of the plurality of mode codes identifies a set of signals used by a type of remote control to control a type of device;
    displaying, to a user, a list of brands;
    wherein each mode code of the plurality of mode codes is associated with one brand in the list of brands, a particular brand in the list of brands being associated with two or more mode codes of the plurality of mode codes;
    in response to receiving a selection of a specific brand in the list of brands from the user, eliminating from consideration one or more mode codes of the plurality of mode codes, the one or more mode codes not being associated with the specific brand, to produce one or more candidate mode codes;

receiving an input signal, at the computing device, from a source remote control, transmitted in response to pressing a particular button on said source remote control; and determining, at the computing device, a particular mode code of said one or more candidate mode codes, the particular mode code is associated with said source remote control based on matching the input signal to a particular signal in a set of signals that are associated with the particular mode code; and transmitting said particular mode code from the computing device to a target remote control, the target remote control configures itself using said particular mode code.

11. The machine-readable storage medium of claim 10, wherein execution of the one or more sequences of instructions by the one or more processors causes the one or more processors to perform the step of:

displaying information identifying said particular mode code on a display.

12. The machine-readable storage medium of claim 11, wherein execution of the one or more sequences of instructions by the one or more processors causes the one or more processors to perform the step of:

displaying instructions, on said display, for submitting said particular mode code to said target remote control.

13. The machine-readable storage medium of claim 10, wherein execution of the one or more sequences of instructions by the one or more processors causes the one or more processors to perform the step of:

displaying information on a display that instructs the user to press said particular button on said source remote control.

14. The machine-readable storage medium of claim 10, wherein execution of the one or more sequences of instructions by the one or more processors causes the one or more processors to perform the steps of:

in response to receiving said input signal, determining a second button on said source remote control that should be pressed to identify the type of said remote control; and displaying information on a display that instructs the user to press said second button.

15. The machine-readable storage medium of claim 10, wherein execution of the one or more sequences of instructions by the one or more processors causes the one or more processors to perform the steps of:

displaying information on a display that instructs the user to select a brand of a device; and receiving a second input signal that identifies said brand of said device.

16. The machine-readable storage medium of claim 10, wherein data encoded in said input signal identifies a particular operation associated with said particular button on said source remote control.

17. The machine-readable storage medium of claim 10, wherein execution of the one or more sequences of instructions by the one or more processors causes the one or more processors to perform the step of:

in response to receiving said input signal, consulting said control data to determine a sequence of one or more buttons on said source remote control that should be pressed to identify said source remote control.

18. The machine-readable storage medium of claim 10, wherein the transmitting step further comprises:

transferring information to said target remote control describing a user interface; and wherein said target remote control displays a user interface on said target remote control based on said user interface information.

19. An apparatus for programming a remote control, comprising:

one or more processors; and a machine-readable storage medium carrying one or more sequences of instructions for programming a target remote control, wherein execution of the one or more sequences of instructions by the one or more processors causes the one or more processors to perform the steps of:

storing control data that identifies a plurality of mode codes, wherein each mode code of the plurality of mode codes identifies a set of signals used by a type of remote control to control a type of device;

displaying, to a user, a list of brands;

wherein each mode code of the plurality of mode codes is associated with one brand in the list of brands, a particular brand in the list of brands being associated with two or more mode codes of the plurality of mode codes;

in response to receiving a selection of a specific brand in the list of brands from the user, eliminating from consideration one or more mode codes of the plurality of mode codes, the one or more mode codes not being associated with the specific brand, to produce one or more candidate mode codes;

receiving an input signal, from a source remote control, transmitted in response to pressing a particular button on said source remote control; and determining a particular mode code, of said one or more candidate mode codes, the particular mode code is associated with said source remote control based on matching the input signal to a particular signal in a set of signals that are associated with the particular mode code; and transmitting said particular mode code to a target remote control, the target remote control configures itself using said particular mode code.

20. The apparatus of claim 19, wherein execution of the one or more sequences of instructions by the one or more processors causes the one or more processors to perform the step of:

displaying information identifying said particular mode code on a display.

21. The apparatus of claim 20, wherein execution of the one or more sequences of instructions by the one or more processors causes the one or more processors to perform the step of:

displaying instructions, on said display, for submitting said particular mode code to said target remote control.

22. The apparatus of claim 19, wherein execution of the one or more sequences of instructions by the one or more processors causes the one or more processors to perform the step of:

displaying information on a display that instructs the user to press said particular button on said source remote control.

23. The apparatus of claim 19, wherein execution of the one or more sequences of instructions by the one or more processors causes the one or more processors to perform the steps of:

in response to receiving said input signal, determining a second button on said source remote control that should be pressed to identify the type of said source remote control; and displaying information on a display that instructs the user to press said second button.

24. The apparatus of claim 19, wherein execution of the one or more sequences of instructions by the one or more processors causes the one or more processors to perform the steps of:
   displaying information on a display that instructs the user to select a brand of a device; and
   receiving a second input signal that identifies said brand of said device.

25. The apparatus of claim 19, wherein data encoded in said input signal identifies a particular operation associated with said particular button on said source remote control.

26. The apparatus of claim 19, wherein execution of the one or more sequences of instructions by the one or more processors causes the one or more processors to perform the step of:
   in response to receiving said input signal, consulting said control data to determine a sequence of one or more buttons on said source remote control that should be pressed to identify said source remote control.

27. The apparatus of claim 19, wherein the transmitting step further comprises:
   transferring information to said target remote control describing a user interface; and
   wherein said target remote control displays a user interface on said target remote control based on said user interface information.

* * * * *